United States Patent [19]

Ouchi et al.

[11] Patent Number: 4,823,208
[45] Date of Patent: Apr. 18, 1989

[54] MULTI SLICE LEVEL SIGNAL CIRCUIT

[75] Inventors: Yasuhide Ouchi, Koganei; Hajime Aoi, Tachikawa; Nobumasa Nishiyama, Hachioji; Takashi Tamura, Odawara; Makoto Saitoh, Tokyo; Reijiro Tsuchiya, Kokubunji, all of Japan

[73] Assignee: Hitachi, Ltd., Tokyo, Japan

[21] Appl. No.: 76,009

[22] Filed: Jul. 21, 1987

[30] Foreign Application Priority Data

Jul. 25, 1986 [JP] Japan .................................. 61-173646

[51] Int. Cl.$^4$ .......................... G11B 5/09; G11B 20/10
[52] U.S. Cl. ......................................... 360/46; 360/67
[58] Field of Search ....................... 360/46, 67, 40, 51; 375/99, 104; 358/282

[56] References Cited

U.S. PATENT DOCUMENTS

| 4,081,756 | 3/1978 | Price et al. ........................ 328/117 |
| 4,399,474 | 8/1983 | Coleman, Jr. ...................... 360/46 |

FOREIGN PATENT DOCUMENTS

| 50-101881 | 2/1977 | Japan .................................. 360/67 |
| 51-92992  | 2/1978 | Japan .................................. 360/67 |
| 58-108831 | 1/1985 | Japan .................................. 360/46 |

Primary Examiner—Alan Faber
Assistant Examiner—Kevin J. Fournier
Attorney, Agent, or Firm—Fay, Sharpe, Beall, Fagan, Minnich & McKee

[57] ABSTRACT

A signal read out circuit included in a magnetic recording device is disclosed in which plural kinds of slice levels are used simultaneously for a reproduced analog waveform to produce a plurality of gate signals corresponding to the slice levels, and it is judged on the basis of the gate signals whether each portion of the reproduced waveform is correct or not in producing a digital output.

17 Claims, 10 Drawing Sheets

MULTI SLICE LEVEL SIGNAL CIRCUIT

BACKGROUND OF THE INVENTION

Figure 1:
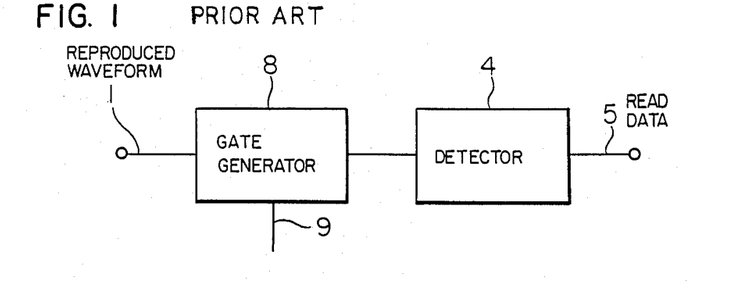
FIG. 1 is a block diagram showing a conventional signal read out circuit.
Figure 2:
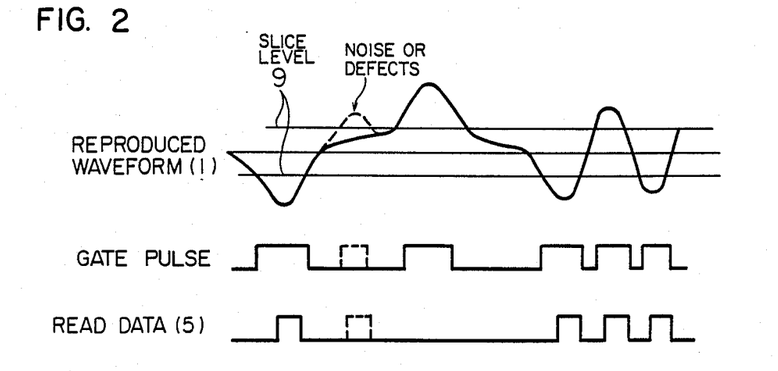
FIG. 2 is a timing chart for explaining the operation of the conventional signal read out circuit and the present invention.

An example of a conventional signal read out circuit included in a magnetic recording device is described in U.S. Pat. No. 4,081,756 (granted to Robert Price et al.). FIG. 1 shows the circuit construction of the above example. The operation of the example will be explained below, with reference to a timing chart shown in FIG. 2. Referring to FIGS. 1 and 2, a reproduced waveform 1 from a magnetic head is applied to a gate generator 8, which produces gate pulses from a reproduced waveform 1 by using a slice level 9, to obtain peak pulses corresponding to peak positions of the reproduced waveform. The peak pulses are applied to a detector 4, which produces read data synchronized with the output signal of a VFO (variable frequency oscillator) and sends the read data to an upper control device. In the above signal read out circuit, however, there arises a problem that when the reproduced waveform 1 has a waveform distortion which is indicated by a broken line in FIG. 2, on the basis of a defect in a recording medium or noise, an erroneous gate pulse is generated, and thus the read data contains an error. When the slice level is raised so as not to generate a gate pulse at a signal portion having the waveform distortion, it is impossible to generate a gate pulse at an undistorted signal portion having a low signal level and thus an error is produced in the read data. As mentioned above, according to the prior art, it is impossible to discriminate between a signal portion and noise which are equal in absolute value of amplitude level to each other.

SUMMARY OF THE INVENTION

An object of the present invention is to provide a signal read out circuit which can accurately discriminate between a true signal portion and noise which are equal in absolute value of amplitude level to each other, to obtain correct read data.

In order to attain the above object, a signal read out circuit according to the present invention includes a level gate generator using a plurality of slice levels such as a high slice level and a low slice level for a reproduced waveform, to obtain a plurality of gate pulse signals corresponding to the slice levels, and a level decision circuit for judging whether or not a signal portion is a true signal portion, o the basis of the gate pulse signals.

By using the plural slice levels and the level decision circuit, the present invention can obtain correct read data from the reproduced waveform, though erroneous read data may be obtained by the prior art.

In an ordinary case, signal portions appearing before and after a signal portion which has a waveform distortion as indicated by a broken line in FIG. 2, have correct (or undistorted) waveform. When a reproduced waveform shown at the top of FIG. 2 is observed, the noise indicated by the broken line can be discriminated from adjacent undistorted signal portions on the basis of the difference in signal level. In the prior art, however, individual signal portions are successively checked without utilizing information on adjacent signal portions, and hence it is impossible to discriminate between an undistorted signal portion and noise which is apart from the undistorted signal portion and has the same amplitude level as the undistorted signal portion. Thus, an erroneous read out operation is performed. According to the present invention, a plurality of slice levels are used for comparing with a reproduced waveform. A signal portion of the reproduced waveform, and a signal portion of the reproduced waveform is checked on the basis of the polarity of the signal portion, a different signal portion spaced apart from the signal portion a distance of one bit and the amplitude level of each signal portion determined by the slice levels. That is, the amount of information is increased, and thus a correct read out operation can be performed. The present invention will be explained below in more detail, with reference to FIG. 2. According to the present invention, a signal portion having a positive or negative high amplitude level is judged to be true (or undistorted). Further, a signal portion having a positive or negative low amplitude level is judged to be true only when the signal portion and a different signal portion spaced apart from the signal portion a distance of one bit are opposite in polarity to each other. Now, let us check the waveform shown at the top of FIG. 2, in accordance with the above rule. The first signal portion (that is, the leftmost peak) has a negative high amplitude level, and hence is considered to be true. The second signal portion has a positive low amplitude level, and the third signal portion has a positive high amplitude level. Hence, the second signal portion is not considered to be true, but the third signal portion is considered to be true. The fourth signal portion has a negative low amplitude level, and the fifth signal portion has a positive low amplitude level. Hence, the fourth signal portion is considered to be true. Thus, correct read data can be extracted from the above waveform.

DESCRIPTION OF THE PREFERRED EMBODIMENT

Figure 3:
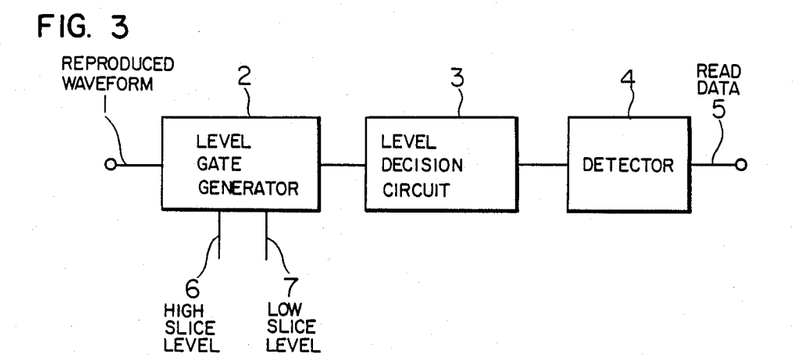
FIG. 3 is a block diagram showing the fundamental construction of a signal read out circuit according to the present invention.

FIG. 3 shows the fundamental construction of a signal read out circuit according to the present invention.

Referring to FIG. 3, a reproduced waveform 1 from the signal reproducing circuit of a magnetic recording device is applied to a level gate generator 2, which produces gate pulse signals from the reproduced waveform 1 by using two slice levels (namely, a high slice level 6 and a low slice level 7). The gate pulse signals are applied to a level decision circuit 3 to judge whether the signal portion is true or not. The output of the level decision circuit 3 is applied to a detector 4 to obtain read data 5 synchronized with the output of a VFO. A few embodiments of the above-mentioned signal read out circuit will be explained below in detail.

EMBODIMENT I

Figure 4:
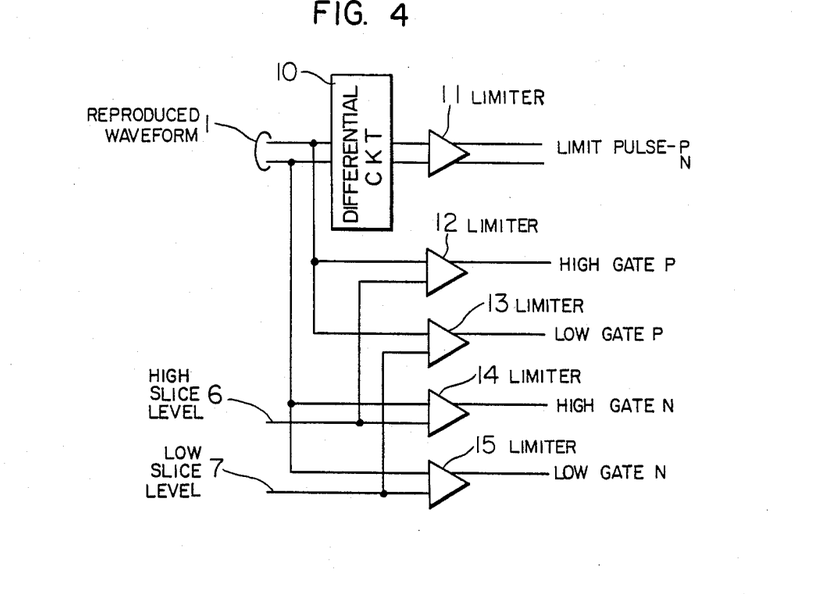
FIGS. 4 to 6 are circuit diagrams showing the detailed circuit construction of an embodiment of a signal read out circuit according to the present invention.
Figure 5:
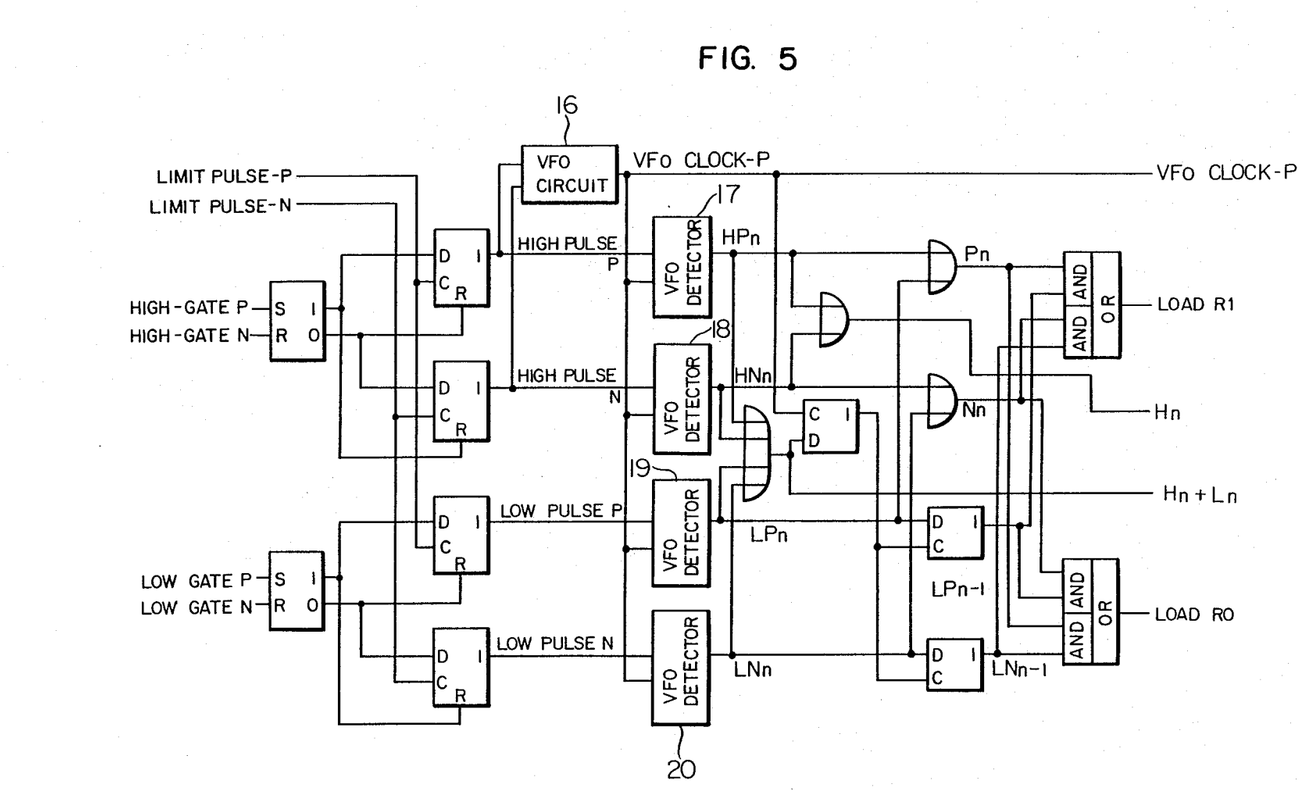
Figure 6:
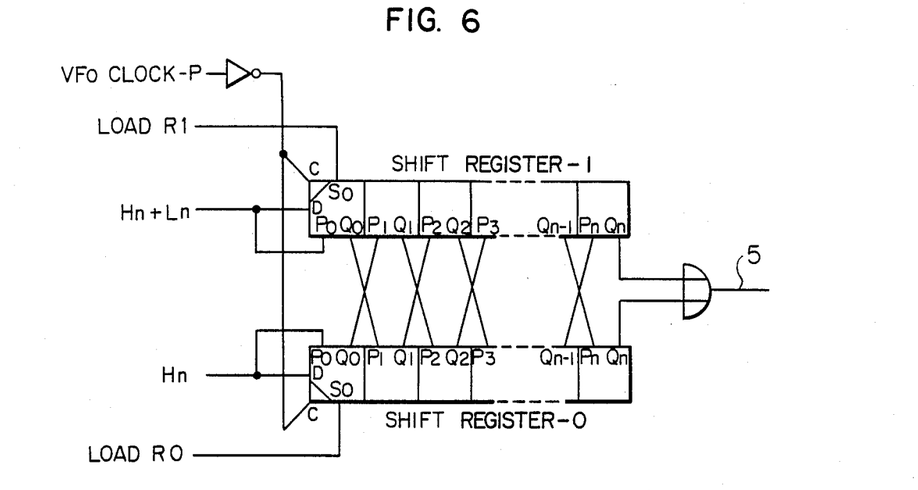
Figure 7:
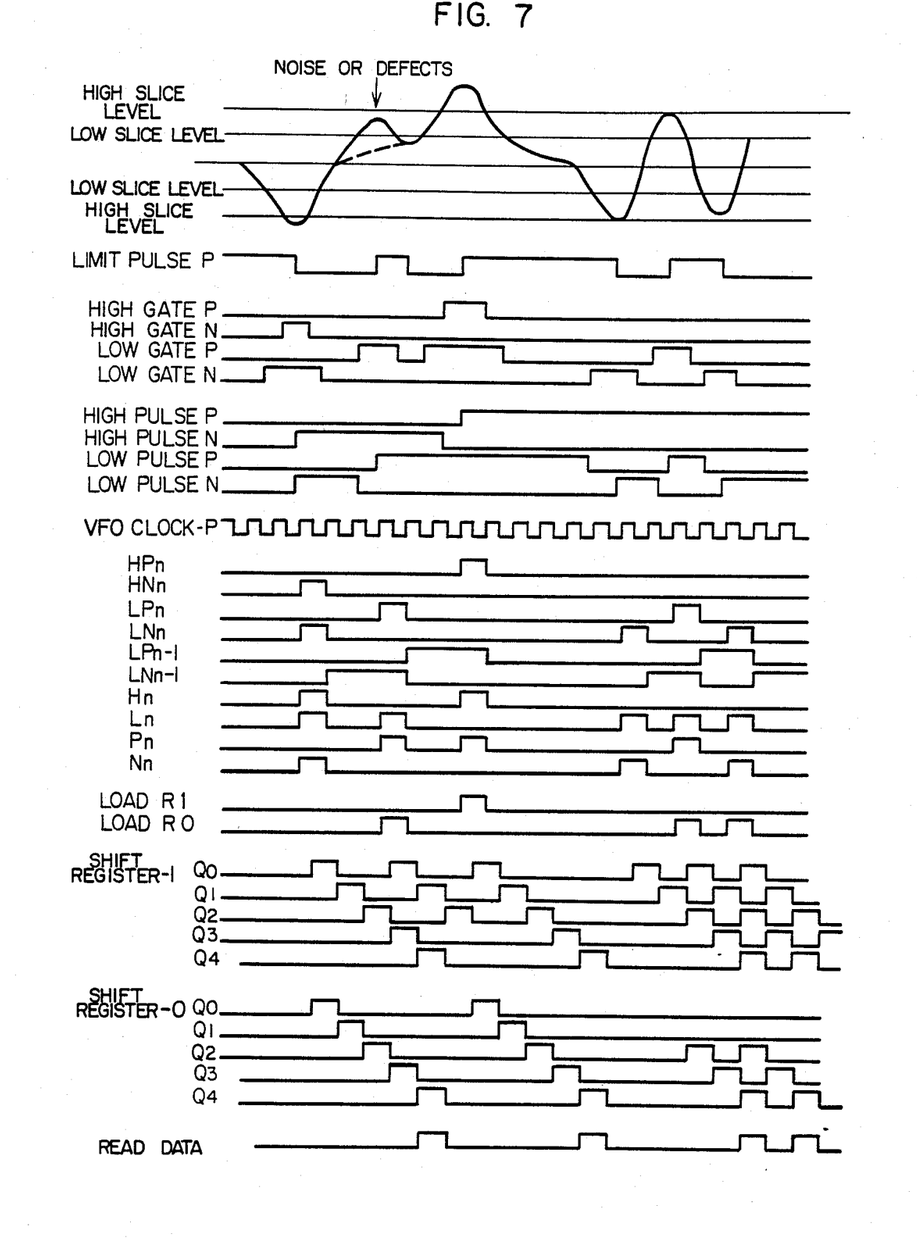
FIG. 7 is a timing chart for explaining the operation of the embodiment of FIGS. 4 to 6.

In the present embodiment, the level gate generator 2 has a circuit configuration shown in FIG. 4, the level decision circuit 3 has a circuit configuration shown in FIG. 5, and the detector 4 has a circuit configuration shown in FIG. 6. FIG. 7 is a timing chart showing various signals which are generated in the present embodiment. Now, the operation of the present embodiment will be explained, with reference to FIGS. 4 to 7.

The reproduced waveform 1 is differentiated by a differentiation circuit 10, and then applied to a limiter 11. Thus, a zero-cross signal which includes pulse signals Limit Pulse-P and Limit Pulse-N, is obtained. Further, four gate pulse signals High Gate P, Low Gate P, High Gate N and Low Gate N are produced by using the high slice level 6, the low slice level 7 and four limiters 12 to 15 for the reproduced waveform 1. The six signals thus obtained are applied to the level decision circuit shown in FIG. 5. In the level decision circuit, four pulse signals High Pulse P, High Pulse N, Low Pulse P and Low Pulse N signals, which are the zero-cross pulse signals extracted with the gate, are first produced from the six signals applied to the level decision circuit. The four pulse signals thus obtained are applied to a VFO circuit 16 and VFO detectors 17 to 20 as shown in FIG. 5, to obtain four signals $HP_n$, $HN_n$, $LP_n$ and $LN_n$ synchronized with a VFO signal (namely, the output of the VFO circuit 16). The signals $HP_n$, $HN_n$, $LP_n$ and $LN_n$ indicate the present state of the reproduced waveform 1. It is evident that the pulse signals Low Pulse P and Low Pulse N may be used as a source signal for driving the VFO circuit in synchronism therewith, in place of the pulse signals High Pulse P and High Pulse N that are shown in FIG. 5 as driving the VFO circuit. Further, in the level decision circuit, signals $LP_{n-1}$ and $LN_{n-1}$ corresponding to the previous state of the signals $LP_n$ and $LN_n$ are formed by flip-flops. Then, the signals $HP_n$, $HN_n$, $LP_n$, $LN_n$, $LP_{n-1}$ and $LN_{n-1}$ are applied to logical circuits as shown in FIG. 5, to obtain signals $H_n$, $H_n+L_n$, Load R1 and Load R0 which are expressed by the following equations:

$$H_n = HP_n + HN_n$$

$$H_n + L_n = HP_n + HN_n + LP_n + LN_n$$

$$\text{Load } R1 = LP_{n-1} \cdot (HP_n + LP_n) + LN_{n-1} \cdot (HN_n + LN_n)$$

$$\text{Load } R0 = LP_{n-1} \cdot (HN_n + LN_n) + LN_{n-1} \cdot (HP_n + LP_n)$$

The signal $H_n$ indicates bits, at which a signal amplitude level exceeds a positive or negative high slice level. The signal $H_n+L_n$ indicates bits, at which an amplitude level exceeds at least a positive or negative low slice level, to indicate that the bits may be desired data. The signal Load R1 indicates that a bit just before a pulse of the signal has a logical value "0". The signal Load R0 indicates that a bit just before a pulse of the signal has a logical value "1".

These signals $H_n$, $H_n+L_n$, Load R1 and Load R0 and a clock signal VFO clock-P from the VFO circuit 16 are applied to the detector of FIG. 6. Thus, correct read data is obtained in the following manner. The signal $H_n+L_n$ indicating data which may be correct data, is applied to a shift register-1, and the signal $H_n$ indicating correct data is applied to a shift register-0. These input signals are shifted in accordance with the clock pulse VFO clock-P. The logical values inputted to the two shift registers may be different from each other at a time the reproduced waveform 1 exceeds only a positive or negative low slice level, since it is not known at this time whether an input bit is correct or not. It is judged whether the above bit is correct or not, after the next bit has been inputted. That is, the signal Load R1 or Load R0 is applied to the shift register-1 or shift register-0, and the contents of one of the two shift registers are loaded into the other shift register, to equalize the input contents to the two shift registers. Thus, the contents of one of the two shift registers coincide with the contents of the other shift register in a period when the input signals are shifted by n bits, and correct read data 5 is obtained. The operation of the detector of FIG. 6 will be explained below in more detail, with reference to FIG. 7. In a case where the reproduced waveform 1 contains noise as indicated by a broken line, a pulse corresponding to the noise is applied to the shift register-1, but is not applied to the shift register-0. At the next bit, the signal Load R1 is applied to the shift register-1, and thus it is known that the above pulse is not a correct one. Accordingly, a logical value inputted to the shift register-0 is loaded into the shift register-1, to correct the bit of the shift register-1 corresponding to the above pulse. Thereafter, the contents of each shift register are shifted by one bit, and then new data are applied to the two shift registers. Accordingly, at the first bit and bits following thereto, the shift register-1 and the shift register-0 have the same contents. Further, a correct signal portion exceeding only a positive or negative low slice level is opposite in polarity to a signal portion adjacent thereto. That is, a pulse corresponding to the above signal portion is judged to be correct, at the next bit. Thus, the signal Load R0 is applied to the shift register-0, and a logical value inputted to the shift register-1 is loaded into the shift register-0, to correct the contents of the shift register-0. Thereafter, the contents of each shift register are shifted by one bit.

As mentioned above, according to the present embodiment, correct read data can be obtained from the low-quality reproduced waveform shown at the top of FIG. 7, though it is impossible to obtain correct read data by the prior art.

The number of bits included in each of the shift register-1 and the shift register-0 is determined in accordance with a coding method used. In the 2 to 7 coding method or 1 to 7 coding method, each shift register includes nine bits or less. The read data from the detector 4 is decoded in a manner corresponding to the coding method.

In the present embodiment, two positive slice levels and two negative levels are used. Three or more positive slice levels and three or more negative slice levels may be used. In this case, three or more shift registers are used to improve the performance of a signal read out circuit. Further, the slice levels may be varied by an external control signal.

EMBODIMENT II

Figure 8:
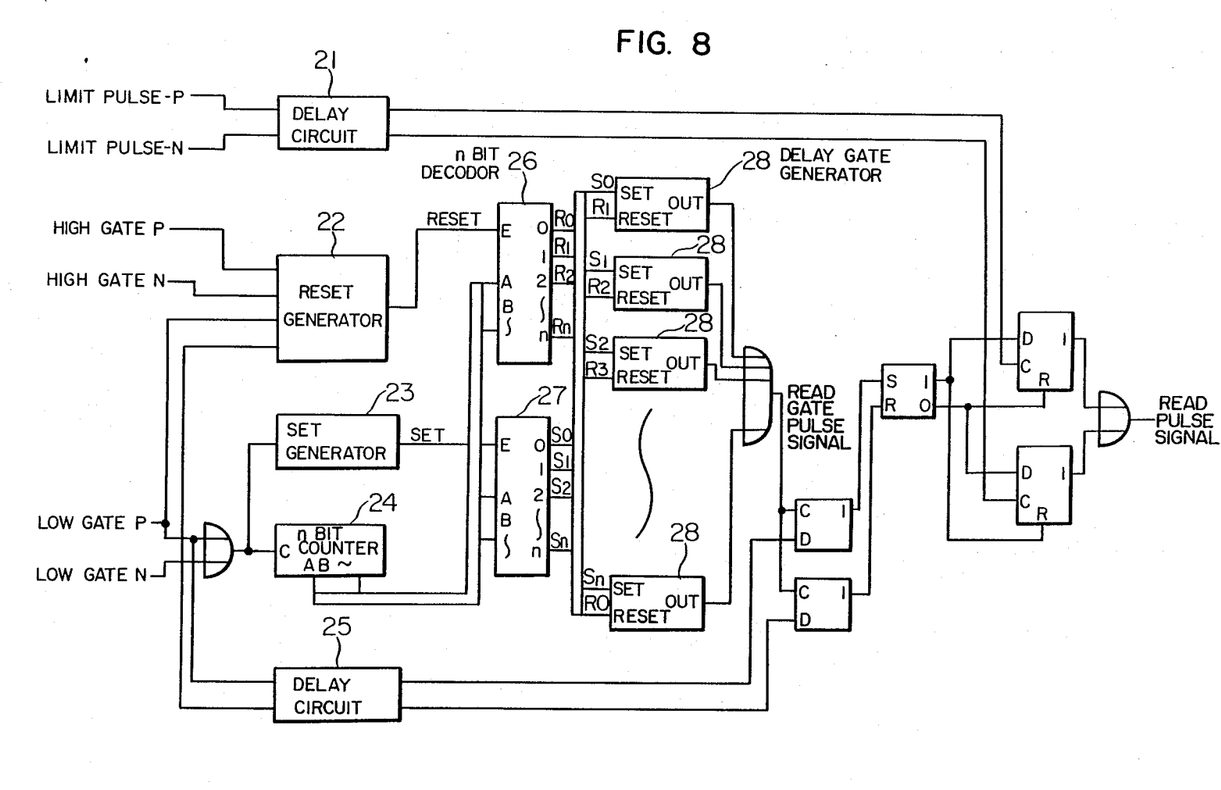
FIGS. 8 to 12 are circuit diagrams showing the detailed circuit construction of another embodiment of a signal read out circuit according to the present invention.
Figure 9:
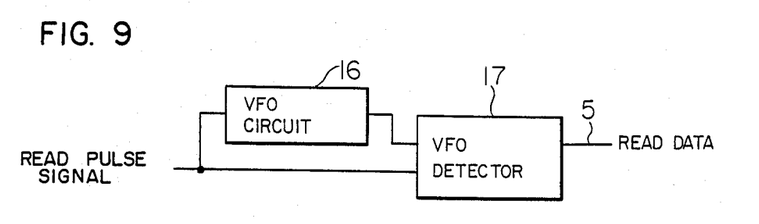
Figure 10:
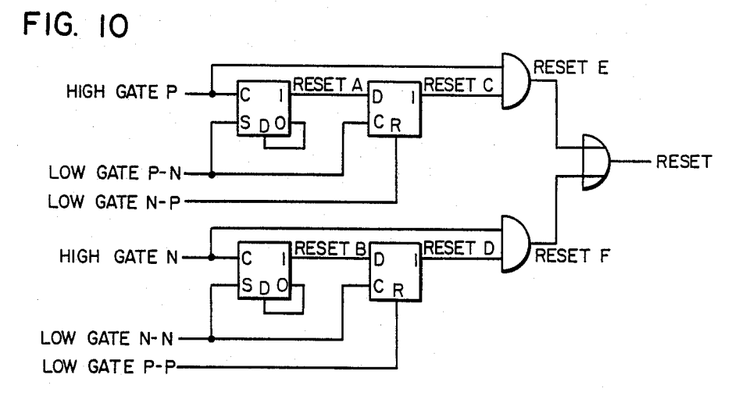
Figure 11:
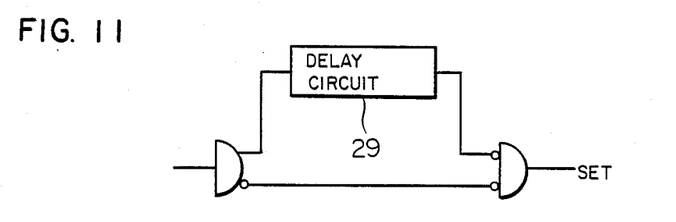
Figure 12:
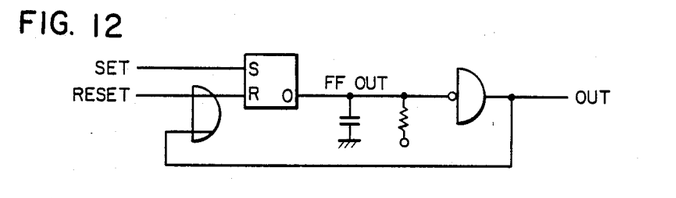
Figure 13:
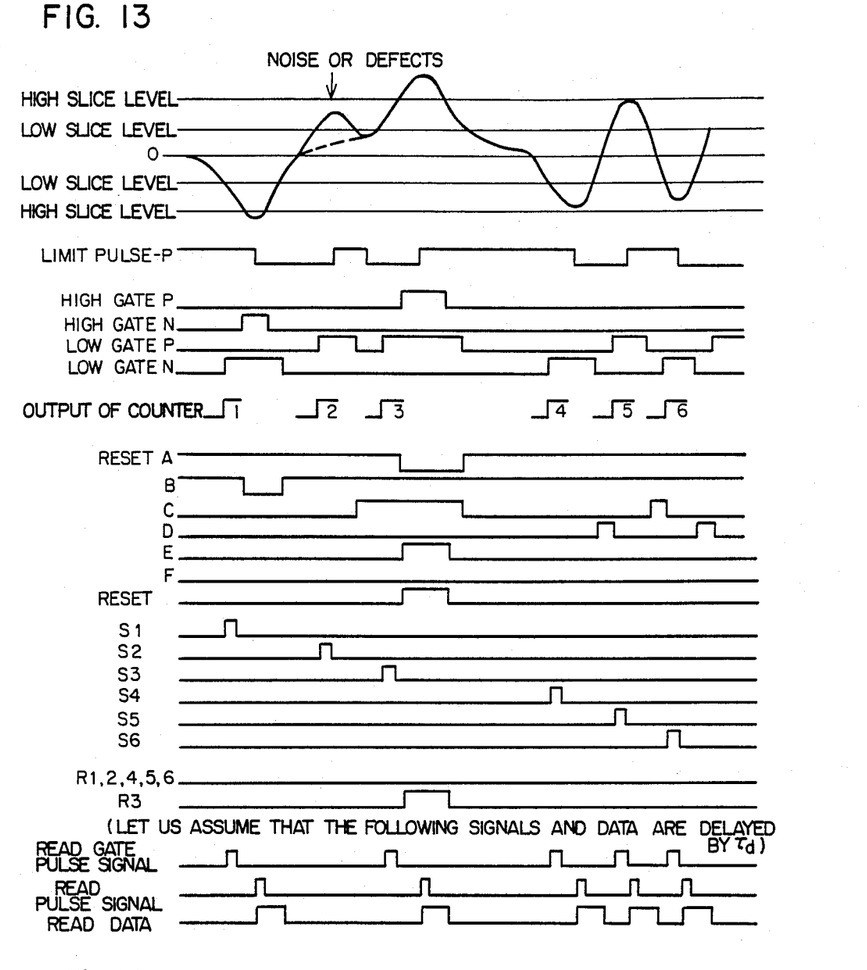
FIGS. 13 and 14 are timing charts for explaining the operation of the embodiment of FIGS. 8 to 12.
Figure 14:
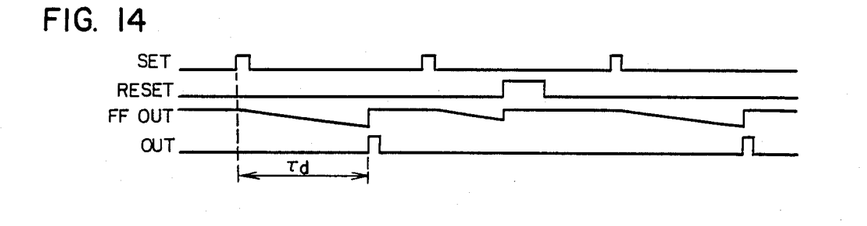

The present embodiment has the fundamental construction shown in FIG. 3. In the present embodiment, the level gate generator 2 has a circuit configuration shown in FIG. 4, the level decision circuit 3 has a circuit configuration shown in FIG. 8, and the detector 4 has a circuit configuration shown in FIG. 9. FIGS. 10 to 12 show examples of the reset generator 22, the set generator 23 and the delayed gate generator 28 of FIG. 8, respectively. FIGS. 13 and 14 are timing charts showing various signals which are generated in the present embodiment.

Now, the operation of the present embodiment will be explained, with reference to FIGS. 4 and 8 to 14.

The operation of the level gate generator 2 is the same as mentioned in the EMBODIMENT I, and hence the pulse signals Limit Pulse-P and Limit Pulse-N and the gate pulse signals High Gate P, High Gate N, Low Gate P and Low Gate N are delivered from the level gate generator 2. The six signals thus obtained are applied to the level decision circuit 3 shown in FIG. 8. The operation of the above level decision circuit is as follows. The six signals are delayed by a time $\tau_d$. In this delay time, a read gate pulse signal containing only correct read gate pulses is produced from the gate pulse signals. A read pulse signal, containing pulses which are the zero-cross pulse signals extracted as the correct read gate pulses, is produced from the read gate pulse signal, the pulse signals Limit Pulse-P and Limit Pulse-N, and other signals. Then, read data synchronized with the output of a VFO circuit 16 is produced from the read pulse signal by the detector 4.

In order to obtain the correct read gate pulses, a set signal including all pulses which may be correct ones, is formed by a set generator 23, and all the pulses included in the set signal are successively allotted to delayed gate generators 28 with the aid of a counter 24 and a decoder 27. While, a reset signal including only erroneous ones of the above pulses is formed by a reset generator 22, to be applied to the delayed gate generators 28 in a state that the reset signal is shifted in relation to the set signal by one bit, with the aid of the counter 24 and another decoder 26. Thus, the set signals of delayed gate generators applied with the erroneous pulses are reset. FIG. 14 shows the operation of delayed gate generators in detail.

As mentioned above, according to the present embodiment, only correct read gate pulses are obtained, to produce correct read pulses, and correct read data can be obtained from the correct read pulses.

Although the circuit configurations of the reset generator 22, the set generator 23 and the delayed gate generator 28 are shown in FIGS. 10, 11 and 12, respectively, these generators 22, 23 and 28 may have other circuit configurations than those shown in FIGS. 10 to 12, provided that other circuit configurations perform the same operations as made by the circuit configurations of FIGS. 10 to 12.

Further, not only the number n of bits included in each of the counter 24, the decoders 26 and 27, and the delayed gate generator 28, but also the delay time $\tau_d$ is determined in accordance with a coding method used. However, when a maximum time interval between adjacent bits and a minimum time interval between adjacent bits are expressed by $T_{max}$ and $T_{min}$, respectively, it is desirable to satisfy a relation $T_{MAX} < \tau_d < n \times T_{min}$.

Similarly to the embodiment described in the EMBODIMENT I, in the present embodiment, also, three or more positive slice levels and three or more negative slice levels may be used, and further slice levels may be varied by an external control signal.

EMBODIMENT III

The present embodiment has the fundamental construction shown in FIG. 3. In the present embodiment, the level gate generator 2 has a circuit configuration shown in FIG. 4, the level decision circuit 3 has a circuit configuration shown in FIG. 15, and the detector 4 has a circuit configuration shown in FIG. 16. FIG. 17 is a timing chart for explaining the operation of the level decision circuit of FIG. 15.

The operation of the present embodiment will be explained below. The operation of the level gate generator 2 is the same as mentioned in the EMBODIMNET I, and hence the pulse signals Limit Pulse-P and Limit Pulse-N and the gate pulse signals High Gate P, High Gate N, Low Gate P and Low Gate N are delivered from the level gate generator 2. These signals are applied to the level decision circuit shown in FIG. 15, to form Raw Data including all of pulses corresponding to gate pulses, and an inhibit pulse signal Inhibit indicating that a pulse just prior to an inhibit pulse is erroneous.

The Raw Data is formed in the following manner. As in the EMBODIMENT I, the pulse signals High Pulse P, High Pulse N, Low Pulse P and Low Pulse N which are the zero-cross pulse signals extracted with the gate pulse signals, are first produced. Then, a high pulse signal High Pulse is produced by applying the pulse signals High Pulse P and High Pulse N to an OR circuit, and a low pulse signal Low Pulse is produced by applying the pulse signals Low Pulse P and Low Pulse N to another OR circuit. The signals High Pulse and Low Pulse are shaped so that pulses contained therein have an appropriate pulse width, and then applied to an OR circuit, to obtain the Raw Data. The inhibit pulse is generated when a pulse of the low pulse signal is followed by a pulse of the high pulse signal which is equal in polarity to the pulse of the low pulse signal. In more detail, a delayed low pulse signal Delay Low Pulse obtained by delaying the low pulse signal Low Pulse, the high pulse signal High Pulse and a D-type flip-flop are used as shown in FIG. 15, to generate the inhibit pulse.

Figure 16:
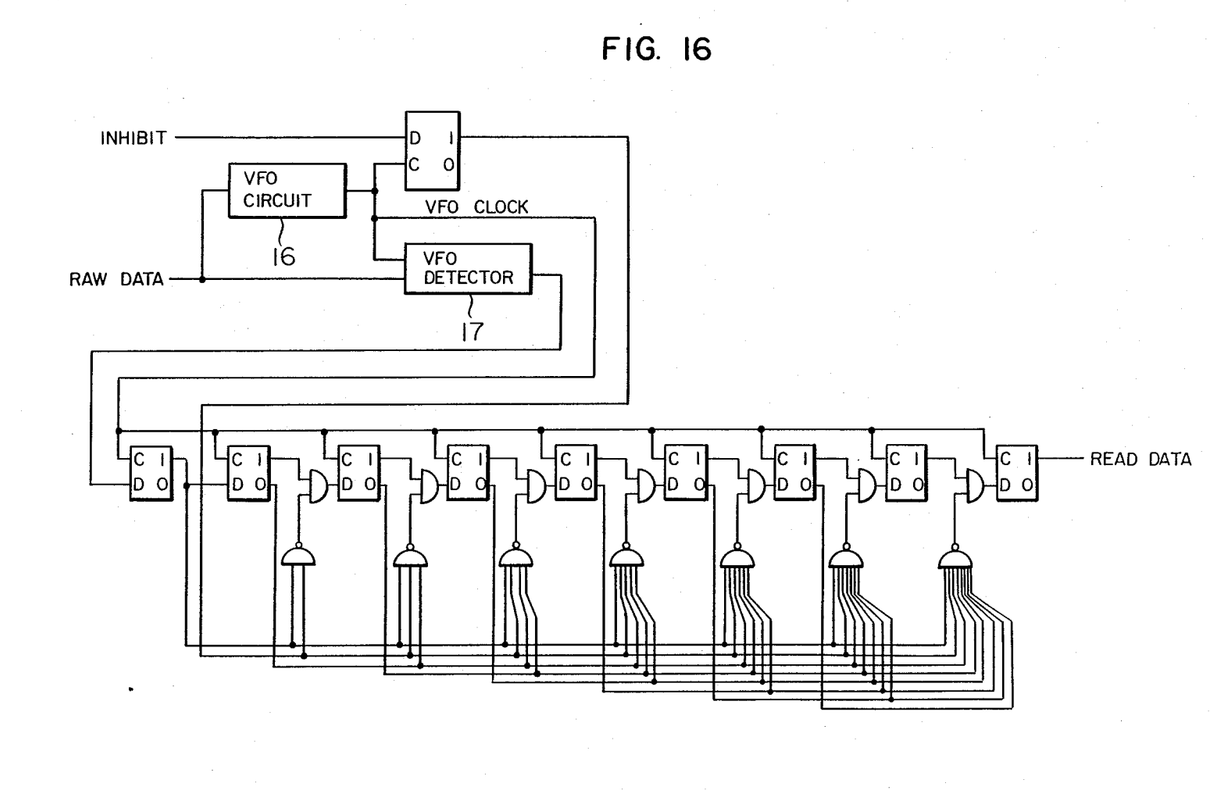
Figure 17:
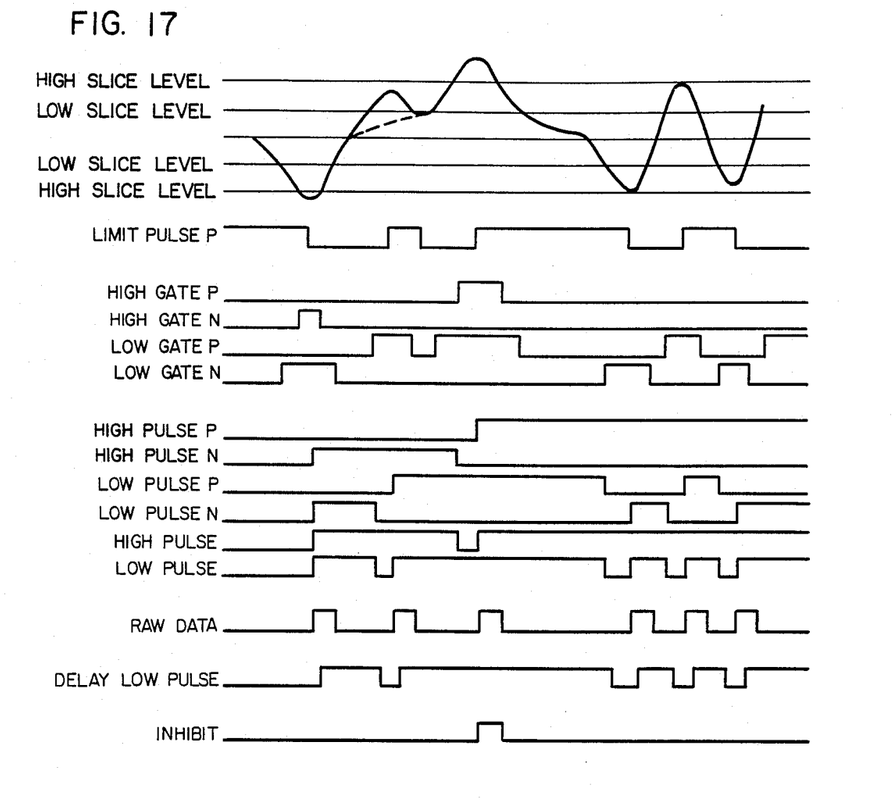
FIG. 17 is a timing chart for explaining the operation of the embodiment of FIGS. 15 and 16.

The Raw Data and the inhibit signal thus obtained are applied to the detector shown in FIG. 16, to synchronize the Raw Data and the inhibit signal with a VFO clock by using a VFO circuit 16, a VFO detector 17 and a D-type flip-flop. The Raw Data synchronized with the VFO clock is shifted in a shift register made up of flip-flops. When the inhibit pulse is applied to the shift register in a period, during which the Raw Data is shifted in the shift register, the logical value "1" at a bit just prior to the inhibit pulse is erased by the circuit configuration of FIG. 16. Thus, the shift register transmits the Raw Data while eliminating an erroneous pulse from the Raw Data.

As mentioned above, according to the present embodiment, only an erroneous pulse is eliminated from pulses which may produce a logical value "1", and thus correct read data can be obtained.

Figure 15:
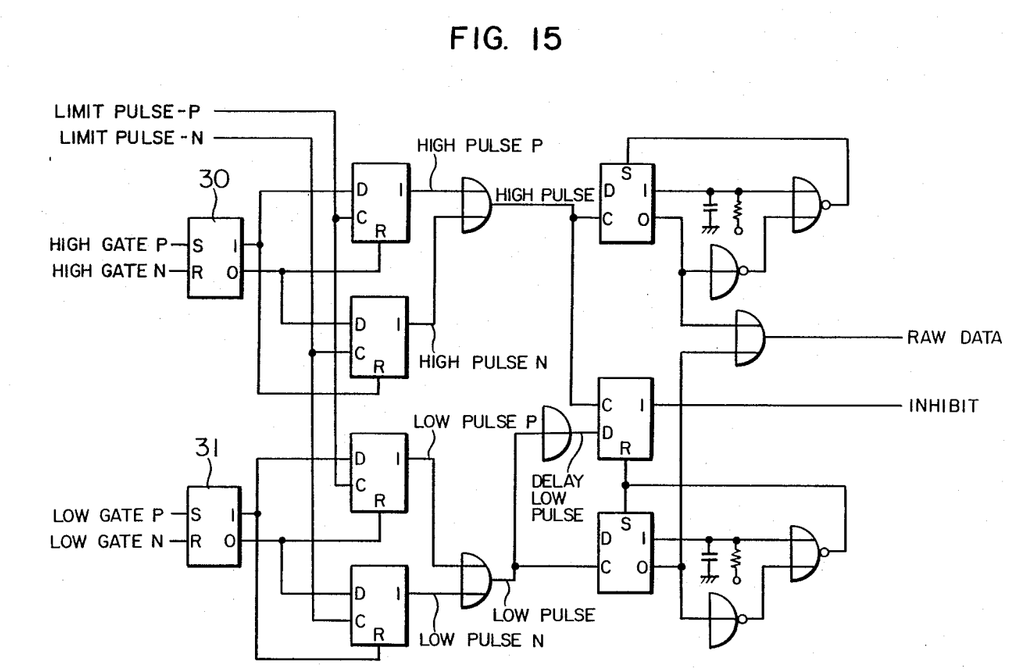
FIGS. 15 and 16 are circuit diagrams showing the detailed circuit construction of a further embodiment of a signal read out circuit according to the present invention.
Figure 18:
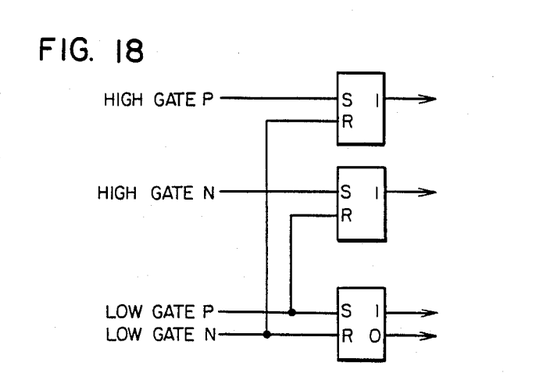
FIG. 18 is a circuit diagram showing another arrangement of SR-flip flops of FIG. 5 and FIG. 15.

Although the level decision circuit 3 and the detector 4 of the present embodiment have circuit configurations shown in FIGS. 15 and 16, the level decision circuit 3 and the detector 4 may have other circuit configurations than those shown in FIGS. 15 and 16, provided that other circuit configurations can produce the Raw Data, the inhibit signal and the correct read data. Further, the arrangement of SR-flip-flops in FIG. 15 may be replaced by the arrangement shown in FIG. 18. As is evident from the above, various changes and modifications can be made in the circuit configuration of the present embodiment, without losing the advantage of the present invention. It is needless to say that various changes and modifications can also be made in the circuit configurations described in the EMBODIMENTS I and II.

Similarly to the embodiments described in the EMBODIMENTS I and II, three or more positive slice levels and three or more negative slice levels can be used in the present embodiment. Further, the slice levels used in the present embodiment may be varied by a control signal.

Similarly to the shift register-1 and shift register-0 shown in FIG. 6, the number of stages of the shift register shown in FIG. 16 is determined in accordance with a coding method used.

As has been explained in the forgoing, according to the present invention, correct read data can be obtained from a low-quality, reproduced waveform which has a waveform distortion and is low in signal-to-noise ratio, though it is impossible to obtain the correct read data by the prior art. In more detail, according to the present invention, it is possible to discriminate between a signal portion and noise having the same amplitude level, and only true signal portions are extracted from the reproduced waveform. Thus, a magnetic recording device can be obtained which is high in reliability and excellent in performance.

We claim:

1. A signal read out circuit included in a magnetic recording device, comprising:
    a level gate generator for producing a plurality of gate pulse signals from a reproduced waveform by using a redetermined number of slice levels, said reproduced waveform being obtained by reproducing information which is recorded on a recording medium, by a magnetic head;
    a level decision circuit for judging whether or not each portion of said reproduced waveform is correct, on the basis of said plural gate pulse signals delivered from said level gate generator; and
    a detector for generating correct read data on the basis of the result of judgement of said level decision circuit;
    wherein said level decision circuit judges that portion of said reproduced waveform which has a signal amplitude level exceeding a predetermined value, to be correct, and judges that portion of said reproduced waveform which has a signal amplitude level between said predetermined value and another predetermined value, to be correct only when said portion and a different portion spaced apart from said portion a distance of one both, are opposite in polarity to each other.

2. A signal read out circuit according to claim 1, wherein said detector includes two shift registers.

3. A signal read out circuit included in a magnetic recording device, comprising:
    a level gate generator for producing a plurality of gate pulse signals form a reproduced waveform by using a predetermined number of slice levels, said reproduced waveform being obtained by reproducing information which is recorded on a recording medium, by a magnetic head;
    a level decision circuit for judging whether or not each portion of said reproduced waveform is correct, on the basis of said plural gate pulse signals delivered from said level gate generator; and
    a detector for generating correct read data on the basis of the result of judgement of said level decision circuit;
    wherein said level decision circuit judges whether or not a portion of said reproduced waveform is correct, on the basis of the signal amplitude level and polarity of each of said portion and at least one different portion after said portion.

4. A signal read out circuit according to claim 3, wherein said plural slice levels are two kinds of slice levels each set on the positive and negative sides.

5. A signal read out circuit included in a magnetic recording device, comprising:
    a level gate generator for producing a plurality of gate pulse signals from a reproduced waveform by using a predetermined number of slice levels, said reproduced waveform being obtained by reproducing information which is recorded wavefrom recording medium, by a magnetic head;
    a level decision circuit for judging whether or not each portion of said reproduced waveform is correct, on the basis of said plural gate pulse signals delivered from said level gate generator; and
    a detector for generating correct read data on the basis of the result of judgement of said level decision circuit;
    wherein said plural slice levels are two kinds of slice levels each set on the positive and negative sides;
    wherein said level gate generator generates a zero-cross pulse signal by differentiating said reproduced waveform, and generates four kinds of gate pulse signals by using said two kinds of slice levels and limiters.

6. A signal read out circuit according to claim 5, wherein said plural slice levels are two kinds of slice levels each set on the positive and negative sides.

7. A signal read out circuit included in a magnetic recording device, comprising:
    a level gate generator for producing a plurality of gate pulse signals from a reproduced wavefrom by using a predetermined number of slice levels, said reproduced waveform being obtained by reproducing information which is recorded on a recording medium, by a magnetic head;
    a level decision circuit for judging whether or not each portion of said reproduced waveform is correct, on the basis of said plural gate pulse signals delivered from said level gate generator; and
    a detector for generating correct read data on the basis of the result of judgement of said level decision circuit
    wherein said plural slice levels are two kinds of slice levels each set on the positive and negative sides;
    wherein said level decision circuit includes a circuit part for obtaining four pulse signals which are the zero-cross pulse signals extracted with said gate pulse signals and another circuit part for generating a VFO clock signal on the basis of said four pulse signals and for producing four kinds of signals synchronized with said VFO clock signal.

8. A signal read out circuit according to claim 7, wherein said plural slice levels are two kinds of slice levels each set on the positive and negative sides.

9. A multi slice level signal detector circuit including a magnetic recording device producing an analog wave form obtained by reproducing information recorded on a magnetic recording medium head to thereby produce correlated digital data, comprising:

level generator means for simultaneously producing a plurality of different reference slice levels, and for producing a plurality of pulse signals by respective comparing the reproduced analog wave form simultaneously with each of said different reference slice levels;

decision circuit means for judging whether or not each portion of the analog wave form is correct, on the basis of said plurality of gate pulse signals delivered from said level generator means to thereby produce a judgement signal; and detector means for generating correct read digital data correlated to the analog wave form on the basis of the result of the judgement signal of said decision circuit means.

10. A circuit according to claim 9, wherein said level generator means different slice levels including at least a high slice level and a low slice level;

said level generator means producing a polarity signal in accordance with the polarity of a portion of the analog wave form;

said decision circuit means judges that portion of the analog wave form that has an amplitude level exceeding said high slice level to be correct, and judges that portion of said analog wave form that has a signal level amplitude between said high and low slice levels to be correct only when said portion and a different portion spaced from said portion a distance of one bit are opposite in polarity to each other.

11. A circuit according to claim 9, wherein said level generator means produces a polarity signal in accordance with the polarity of a portion of the analog wave form;

said decision circuit means judges that portion of the analog wave form to be correct based upon said pulse signals and polarity signal of both said portion and a different portion spaced from said portion a distance of one bit.

12. A circuit according to claim 9, wherein said decision circuit means generates raw data pulses each representing a zero cross portion of a differentiation of said analog wave from and further generates inhibit pulses each indicating that a prior raw data pulse is erroneous.

13. A circuit according to claim 12, wherein said detector means eliminates any erroneous data pulses in response to said inhibit pulses.

14. The circuit according to claim 9, wherein said decision circuit means judges a portion of the analog wave form that corresponds to one bit of digital data to be correct or not based upon said pulse signals of said portion spaced from said portion a distance of one bit.

15. In a magnetic recording device having a magnetic medium with stored information and a magnetic read head for producing an analog wave form obtained by reproducing the information recorded on the medium, a multi-slice level signal detector circuit for transforming the analog waveform into a corresponding digital signal and eliminating erroneous pulses produced by noise in the analog wave form, said circuit comprising:

level generator means for simultaneously producing at least high slice level and low slice level different references both above and below the amplitude level of the analog wave form;

said level generator means producing a plurality of pulse signals from a comparison of the analog wave form simultaneously with said high slice level and low slice level both above and separately below the average level amplitude;

decision circuit means for producing raw data pulses, with each of said raw data pulses corresponding to said analog signal respectively exceeding in amplitude, as measured away from said average amplitude in both the positive and negative directions, anyone of said low slice level and high slice level to thereby produce a train of raw data pulses corresponding to correct digital pulses and noise pulses;

said decision circuit means further producing an inhibit pulse each time a low slice level pulse on one polarity side of said average amplitude is immediately followed by a high slice level pulse on the same side of said average amplitude, to thereby indicate that the preceding low slice level pulse was erroneously caused by noise; and detector means for eliminating the erroneous noise low slice level pulse from said raw data pulses in accordance with said inhibit pulse, and thereby producing correct digital output data corresponding to the analog wave form.

16. The circuit according to claim 15, wherein said detector means includes a shift register and means responsive to said inhibit pulse for preventing a shifting of the erroneous noise low slice level pulse within said shift register.

17. The circuit according to claim 16, wherein said decision circuit means includes means for delaying the low slice level pulse to produce a delayed low pulse, means for comparing the delay low pulse with the high slice level pulse and producing said inhibit pulse when their polarity is the same.

* * * * *